United States Patent

Nakamachi et al.

[11] Patent Number: 5,571,006
[45] Date of Patent: Nov. 5, 1996

[54] REGENERATIVE BURNER, BURNER SYSTEM AND METHOD OF BURNING

[75] Inventors: Ichiro Nakamachi, Abiko; Kenji Koizumi, Tokyo, both of Japan

[73] Assignee: Tokyo Gas Company, Ltd., Tokyo, Japan

[21] Appl. No.: 506,030

[22] Filed: Jul. 24, 1995

[51] Int. Cl.$^6$ ............................................. F23D 11/44
[52] U.S. Cl. .............................. 431/11; 431/164; 432/181
[58] Field of Search ................................ 431/9, 11, 164; 432/180, 181

[56] References Cited

U.S. PATENT DOCUMENTS

| | | | |
|---|---|---|---|
| 4,818,884 | 4/1989 | Saubolle | 250/388 |
| 4,842,509 | 6/1989 | Hasenack | 431/10 |
| 4,923,291 | 5/1990 | Gitman | 431/10 |
| 4,983,118 | 1/1991 | Hovis et al. | 431/115 |
| 5,154,599 | 10/1992 | Wunning | 431/215 |
| 5,413,477 | 5/1995 | Moreland | 431/164 |
| 5,431,147 | 7/1995 | Tanaka et al. | 432/181 |

*Primary Examiner*—Carroll B. Dority
*Attorney, Agent, or Firm*—Townsend & Banta

[57] ABSTRACT

The present invention is directed to a regenerative burner, burner system and method of burning using regenerative burners which comprises a fuel supply section with its tip opening into a furnace provided along the burner axis; a flame stabilizing section, provided at the tip of the fuel supply section; a room temperature air supply section with its tip also opening into the furnace, provided around the fuel supply section; plural pre-heated high temperature air supply sections with their tips opening into the furnace, provided around but apart from the fuel supply section; heat storage material, upstream from the tip of the pre-heated high temperature air supply section.

13 Claims, 6 Drawing Sheets

REGENERATIVE BURNER, BURNER SYSTEM AND METHOD OF BURNING

BACKGROUND OF THE INVENTION

1. Field of the Invention

The present invention is directed to a regenerative burner, burner system and method of burning using regenerative burners which comprises a fuel supply section with its tip opening into a furnace provided along the burner axis; a flame stabilizing section, provided at the tip of the fuel supply section; a room temperature air supply section with its tip also opening into the furnace, provided around the fuel supply section; plural pre-heated high temperature air supply sections with their tips opening into the furnace, provided around but apart from the fuel supply section; and heat storage material, upstream from the tip of the pre-heated high temperature air supply section.

2. Description of Related Art

Figure 1:
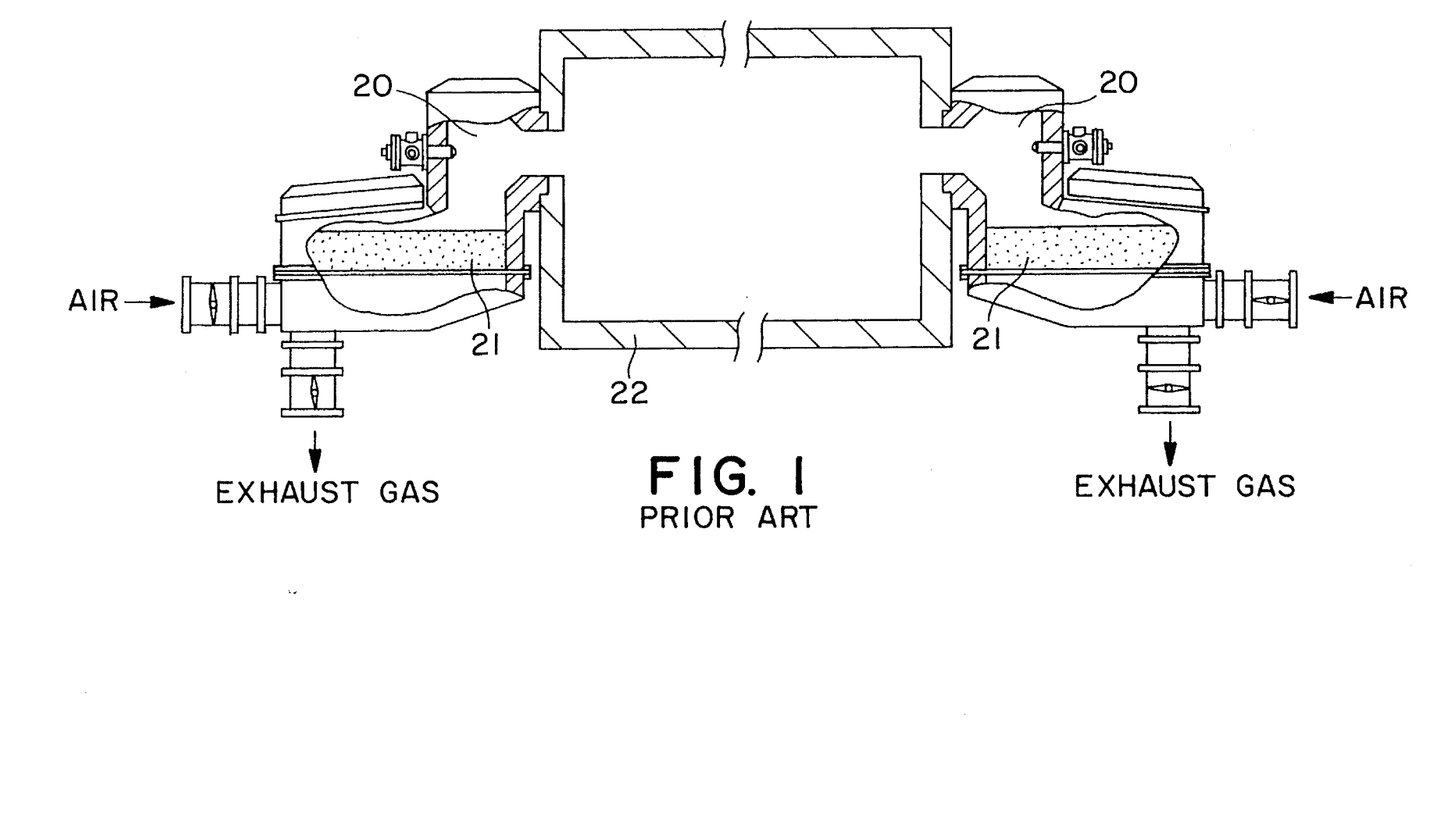
FIG. 1 is an illustration of a pair of conventional regenerative burners installed in a furnace.

A conventional regenerative burner has an integrated structure consisting of a combustion section 20 and a regenerative section 21. A pair of regenerative burners having this structure are installed in a furnace 22, for alternate selective combustion as shown in FIG. 1. In the burner, air passes through the regenerative section where it is pre-heated. When the exhaust gas passes through the regenerative section the heat is stored, to be used in turn to pre-heat the intake air. This results in the recovery of waste heat, thereby achieving a high degree of thermal efficiency.

The regenerative burners shown in FIG. 1 require that the combustion sections and the regenerative sections of the burners be lined with a refractory material for heat insulation, since they are subject to the flow of high temperature exhaust gas and the generation of high temperature flames. Furthermore, since the fuel supply sections are also exposed to high temperature at their tips, they deteriorate due to high temperature oxidation. To avoid this, air cooling or water cooling must be used. Moreover, the complicated and large structure of the entire apparatus increases the overall furnace equipment cost, and combustion in the presence of pre-heated high temperature air significantly increases NOx (nitrogen oxide) emissions.

SUMMARY OF THE INVENTION

The present invention provides a regenerative burner comprising a fuel supply section with its tip opening into a furnace, provided along the burner axis; a flame stabilizing section provided at the tip of the fuel supply section; a room temperature air supply section with its tip also opening into the furnace, provided around the fuel supply section; plural pre-heated high temperature air supply sections with their tips also open into the furnace, provided around the room temperature air supply section; a header, provided upstream of the pre-heated high temperature air supply sections; and heat storage material, provided upstream of the header.

The present invention also provides a regenerative burner system comprising one or more pairs of the regenerative burners of the present invention operatively provided in a furnace.

In addition the present invention further provides a regenerative combustion method using the regenerative burner system of the present invention. The steps of the method include supplying air from the room temperature air supply section into the furnace, supplying fuel from the fuel supply section into the furnace, mixing the air with fuel at the flame stabilizing section for the continuous combustion of all the regenerative burners when the furnace temperature is below the ignition temperature, burning the air and fuel, stopping the air supply into the room temperature air supply section when the furnace temperature is above the ignition temperature and at the same time supplying pre-heated air from the pre-heated high temperature air supply sections. Further the method is continued in an alternate fashion between each burner of a pair of burners, achieving combustion in the furnace.

In another embodiment of the regenerative combustion method the steps are similar to those cited above except the air from the room temperature air supply section is supplied into the furnace in a steady fashion to form a stable flame while the pre-heated air is supplied first from the pre-heated high temperature air section of one burner and then from the other while the first pre-heated high temperature air section operates as an exhaust vent.

Symbols 1 furnace wall
2 furnace
3 fuel supply section
4 flame stabilizing section
5 room temperature air supply section
6 pre-heated high temperature air supply section
7 header
8 heat storage material
9 change-over valve
10 regenerator
11 heat storage material inlet
12 heat storage material outlet
13 room temperature air supply inlet
14 pre-heated high temperature air supply inlet
15 a pilot burner
16 furnace combustion gas
18 stable flame
19 flame detector
20 combustion section
21 regenerative section
22 furnace body

DESCRIPTION OF THE PREFERRED EMBODIMENTS

To solve the problems of conventional regenerative burners discussed above, the present invention provides a regenerative burner comprising a fuel supply section with its tip opening into a furnace, provided along the burner axis; a flame stabilizing section provided at the tip of the fuel supply section; a room temperature air supply section with its tip also opening into the furnace, provided around the fuel supply section; plural pre-heated high temperature air supply sections with their tips also open into the furnace, provided around the room temperature air supply section; a header, provided upstream of the pre-heated high temperature supply sections; and heat storage material, provided upstream of the header.

In one embodiment of the invention it is preferable for the header to be tapered. It is also preferable that the regenerative burners be installed far enough into a furnace that the heat storage material is located wholly or partially in the furnace wall.

In another embodiment the burner also includes a pilot burner which is preferably located within the room temperature air supply section and near the flame stabilization section. In yet another embodiment the regenerator filled with heat storage material is tapered toward the front side and a heat storage material inlet is provided at the top of the regenerator on the rear side, while a heat storage outlet is provided at the bottom. In a still further embodiment, the room temperature air supply section and the inlet of the pre-heated high temperature air supply section are provided with a change-over valve for opening either or both and closing either of the two inlets.

The present invention is also directed to a regenerative burner system comprising one or more pairs of the regenerative burners of the present invention operatively provided in a furnace.

In addition the present invention is further directed to a regenerative combustion method using the regenerative burner system of the present invention. The steps of the method include supplying air from the room temperature air supply section into the furnace, supplying fuel from the fuel supply section into the furnace, mixing the air with fuel at the flame stabilizing section for continuous combustion of all the burners when the furnace temperature is below the ignition temperature, burning the air and fuel, stopping the air supply into the room temperature air supply section when the furnace temperature is above the ignition temperature and at the same time supplying pre-heated air from the pre-heated high temperature air supply sections in alternate fashion for combustion.

A still further embodiment of the present invention is a regenerative combustion method using the regenerative burner system of the present invention comprising the steps of supplying air into the room temperature air supply section irrespective of whether the burner is in combustion mode or exhaust mode, to form a stable flame at the flame stabilization section and completing the combustion of fuel injected into the furnace by alternatively using pre-heated air injected from the pre-heated high temperature air supply section from one or the other burner and carry along by incorporating (entraining) the furnace gas. This embodiment of the regenerative combustion method is similar to that cited above except the air from the room temperature air supply section is supplied into the furnace in a steady fashion to form a stable flame while the pre-heated air is supplied first from the pre-heated high temperature air section of one burner and then from the second while the first pre-heated high temperature air section operates as an exhaust vent.

In the present invention a furnace may be installed with one or more pairs of regenerative burners which are to be used in the alternative, for regulating combustion in the furnace. Each regenerative burner is comprised of a fuel supply section which opens directly into the furnace; a flame stabilization section located at the interface between the burner and the furnace; a room temperature air supply section which opens directly into the furnace; a pre-heated high temperature air supply section which also opens directly into the furnace; and a regenerator upstream from the pre-heated high temperature air supply section. The burners installed in the furnace provide a regenerative burner system in which each pair of burners operate in coordination, such that each burner alternates in driving the combustion in the furnace by providing pre-heated high temperature air. In this system when the furnace temperature is low, a stabilized flame is formed at a flame stabilization section installed at the tip of the fuel supply section of each burner, and when the furnace temperature is high, pre-heated air is used for furnace combustion with the stabilizing flame being either extinguished or sustained.

The flame stabilizing section exists apart from the pre-heated high temperature air supply sections which have regenerative sections upstream from the pre-heated high temperature air sections, and the resulting combustion at the flame stabilization section occurs inside the furnace.

Examples of various embodiments of the present invention are shown in FIGS. 2 through 6. In these examples a fuel supply section 3 with its tip opening into a furnace 2 is provided and a flame stabilization section 4 is provided at the tip of said fuel supply section 3. Around the fuel supply section 3, a room temperature air supply section 5 is located with its tip opening into the furnace 2. Around the room temperature supply section 5 plural pre-heated high temperature air supply sections 6 with tips opening into the furnace 2 are provided. Upstream of the pre-heated high temperature air supply sections 6, a header 7 is provided. Upstream of the header 7, heat storage material 8 is provided.

The header 7 is preferably tapered and the heat storage material when the burners are installed in the furnace, is preferably located wholly or partially in the furnace wall 1. The regenerator 10 is packed with the heat storage material 8 and is preferably tapered toward the front (side toward the furnace ) and a heat storage material inlet 11 is provided, preferably at the top of the regenerator 10 at the rear side (side away from the furnace) while a heat storage material outlet 12 is provided, preferably at the bottom. If the pre-heated high temperature air supply sections 6 are provided as plural air holes for injecting pre-heated high temperature air, the injected air can effectively suck the furnace combustion gas into the high temperature air injection stream, mixing the two and allowing for large-volume recirculation of furnace combustion gas.

Furthermore, the inlet 13 of the room temperature air supply section and the inlet 14 of the pre-heated high temperature air supply sections can be provided with a change-over valve 9 to open or close either of the inlets 13 or 14. The storage material 8 is preferably ceramic or metal balls, honeycomb, fin meshes or any combination of the same.

A pilot burner 15 is optionally located through the room temperature air supply section 5 near the flame stabilizing section 4. Properly matched pairs of regenerative burners A and B (shown in FIGS. 3 and 5) are installed in a furnace to be used fur alternate combustion by either one of each pair to provide cyclic regenerative combustion.

Figure 2A:
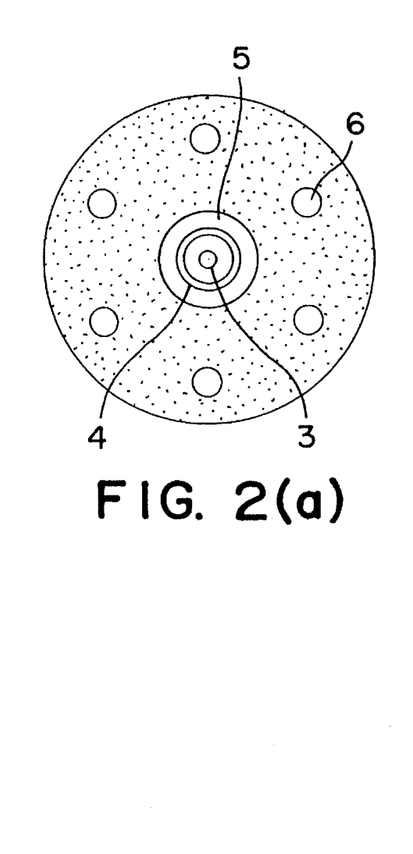
FIG. 2(a) and 2(b) is an expanded top and side view of an important section of an embodiment of the regenerative burner of the present invention.
Figure 2B:
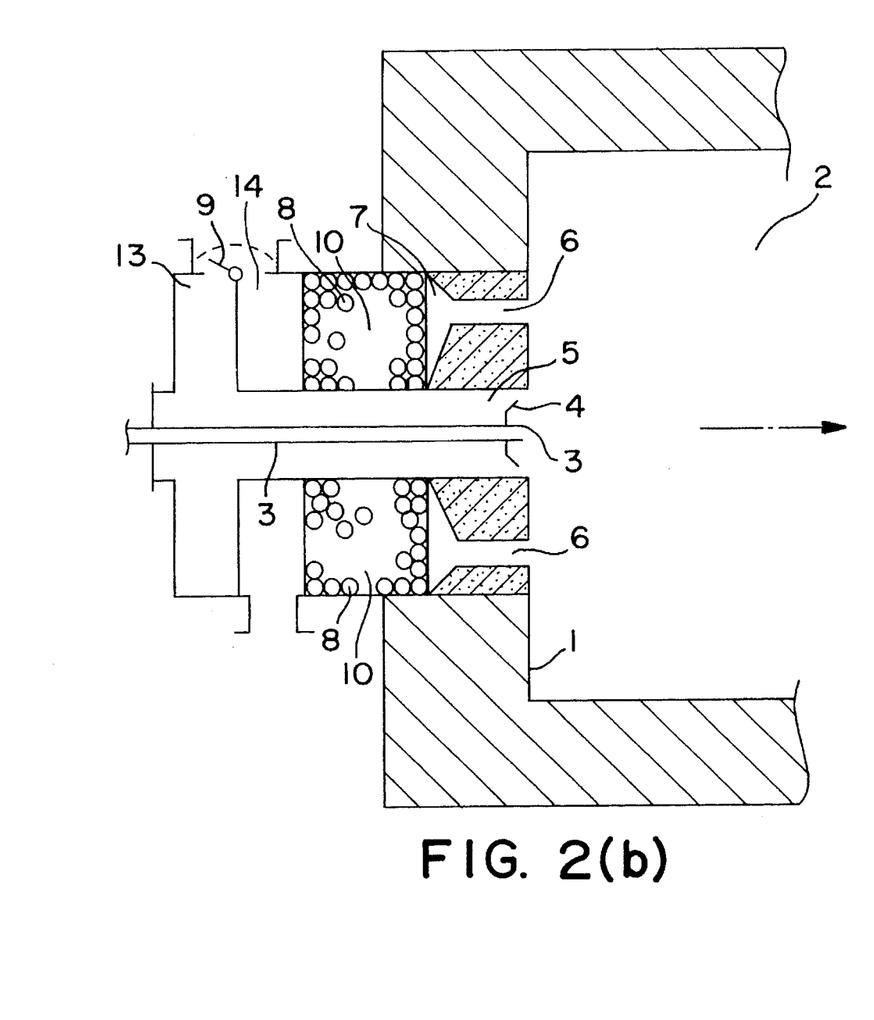
Figure 3:
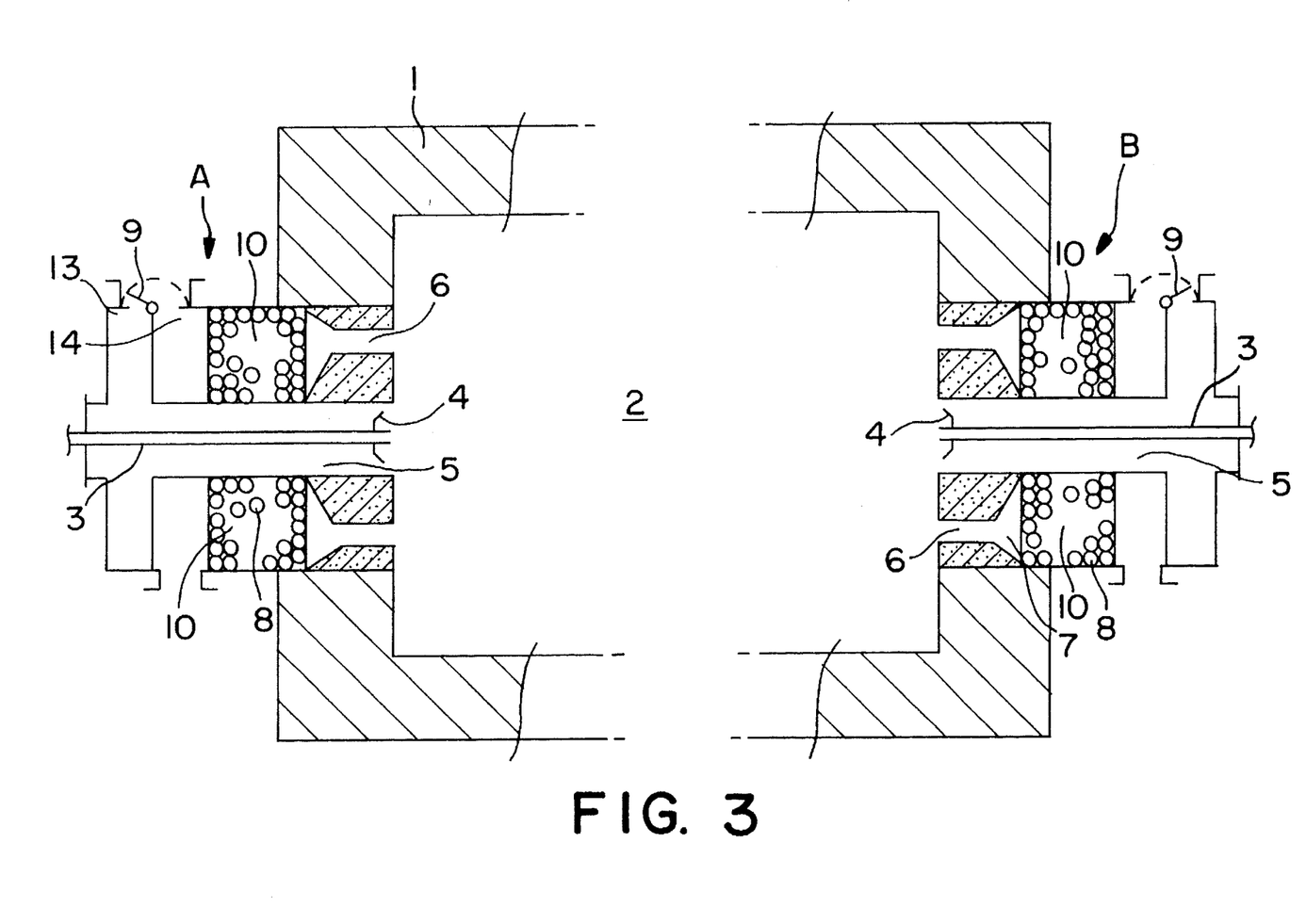
FIG. 3 is an illustration of an installed pair of regenerative burners of the present invention shown in FIG. 2.

In FIGS. 2 and 3 the regenerative burners (A and B) are provided with a change-over valve 9 which is operated to allow air to be wholly or partially introduced into the room temperature air supply section 5. When fuel is introduced into the the supply section 3 of regenerative burner A (in combustion mode), it is mixed with the air injected from the room temperature air supply section 5, near the flame stabilizing section 4 on the downstream side, to initiate combustion. This combustion takes place with the fuel surrounded by fresh air, and since the furnace combustion gas (an inert gas) is not mixed with the initial combustion mixture, the combustion is very stable and forms a stable flame area. The combustion at the flame stabilizing section 4 in this case, is achieved using cold air rather than pre-heated air, and thus the flame temperature is kept low. Therefore, the fuel supply section 3 and the flame stabilizing section 4 are protected from deterioration due to high temperature oxidation. While some air is introduced into the room temperature air supply section 5, the remaining air necessary for complete fuel combustion, is injected into the furnace 2 through the plural pre-heated high temperature air supply sections 6, where the furnace combustion gas is entrained, mixed with the stable flame formed at the flame stabilizing section 4, thereby sustaining combustion. When the furnace temperature becomes sufficiently high, for example about 800° C., the change-over valve 9 is activated to introduce air into the pre-heated high temperature air supply sections 6. In this situation, the flow of air into the room temperature air supply section 5 is stopped. Air is fed through the heat storage material 8 and equilibrated in the header 7, reaching the pre-heated high temperature air supply section 6, then injected into the furnace 2 while interacting with the furnace combustion gas. The air which entrains the furnace combustion gas is mixed with the fuel which has been injected from the fuel supply section 3, which is no longer mixed with room temperature air, the fuel is ejected into the furnace and mixed with the pre-heated high temperature air and the furnace combustion gas, for sustained combustion.

As described above, in the present invention, since air and fuel are directly injected into a wide furnace volume, unlike conventional combustion methods of injecting air and fuel into a narrow burner space for mixing and burning, the various jets from the injecting sources suck large volumes of furnace gas into the jets for large volume mixing. Therefore, the furnace gas as an inert gas becomes involved in the combustion field in a large quantity which greatly lowers the flame temperature which in turns results in reduced thermal nitrogen oxide (NOx) formation. The post-combustion exhaust gas in the furnace is discharged through the pre-heated high temperature air supply sections 6 of regenerative burner B which is in exhaust mode, resulting in the pre-heating of heat storage material 8. The above combustion and exhaust cycle are alternatively repeated by regenerative burners A and B, for example at a rate of every tens of seconds to every several minutes. In this case, if the temperature of the furnace 2 is kept sufficiently high, for example greater than about 800° C., combustion stability is secured due to the high temperature, and it is not necessary to introduce any more air from the room temperature air supply section 5. In the regenerative burning method, since the combustion occurs only in the furnace 2 and not in the regenerator section, the burner tiles for enclosing the flame used in ordinary burners are not required. Furthermore, since the heat storage material 8 is partially or wholly located in the furnace wall, the exhaust temperature in the furnace wall is kept low thus not requiring any refractory heat-insulating lining in the regenerator. These are significant advantages provided by the present invention.

Figure 4A:
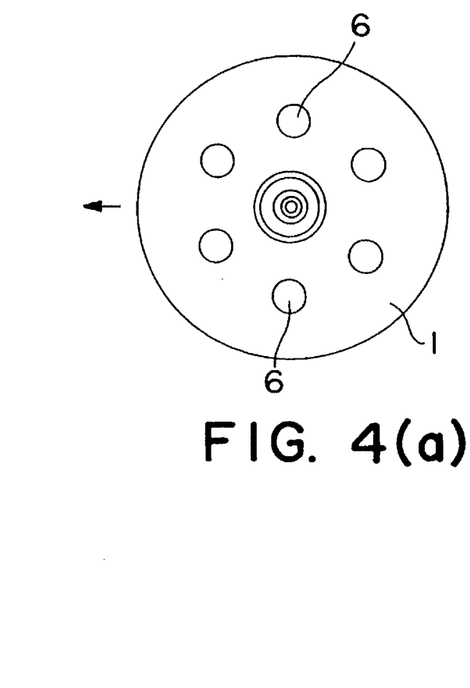
FIG. 4(a) and 4(b) is an illustration of another embodiment of the regenerative burner of the present invention.
Figure 4B:
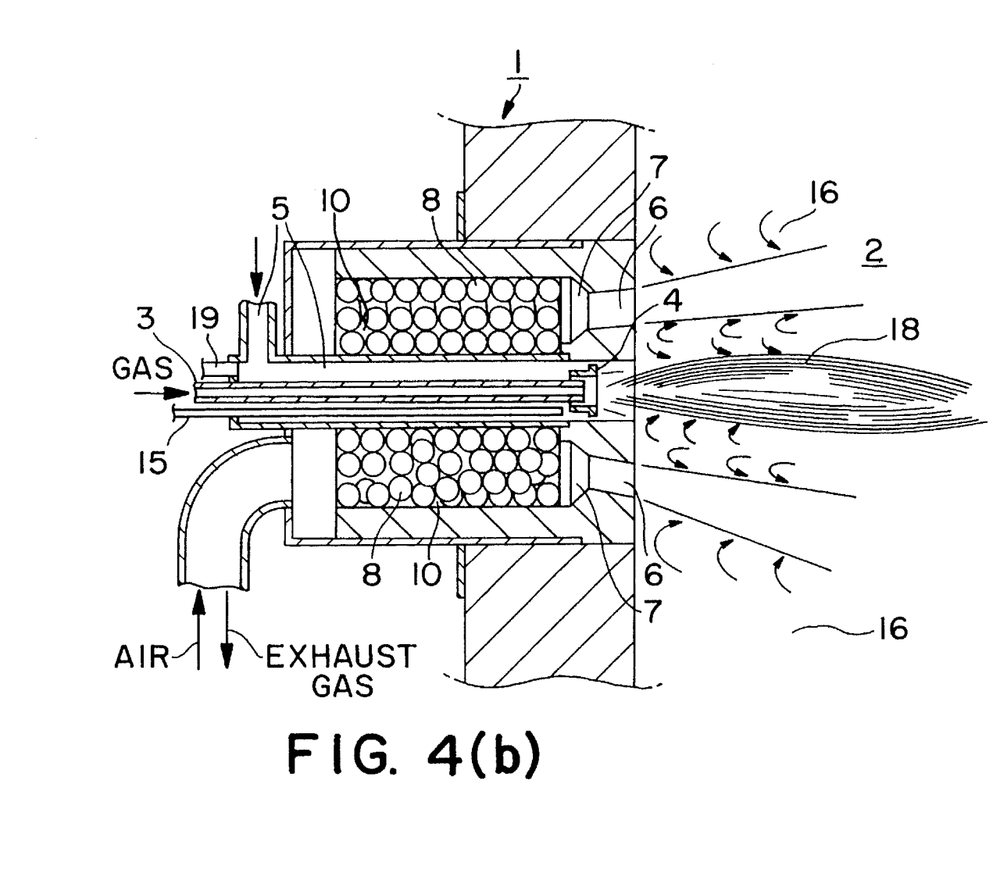
Figure 5:
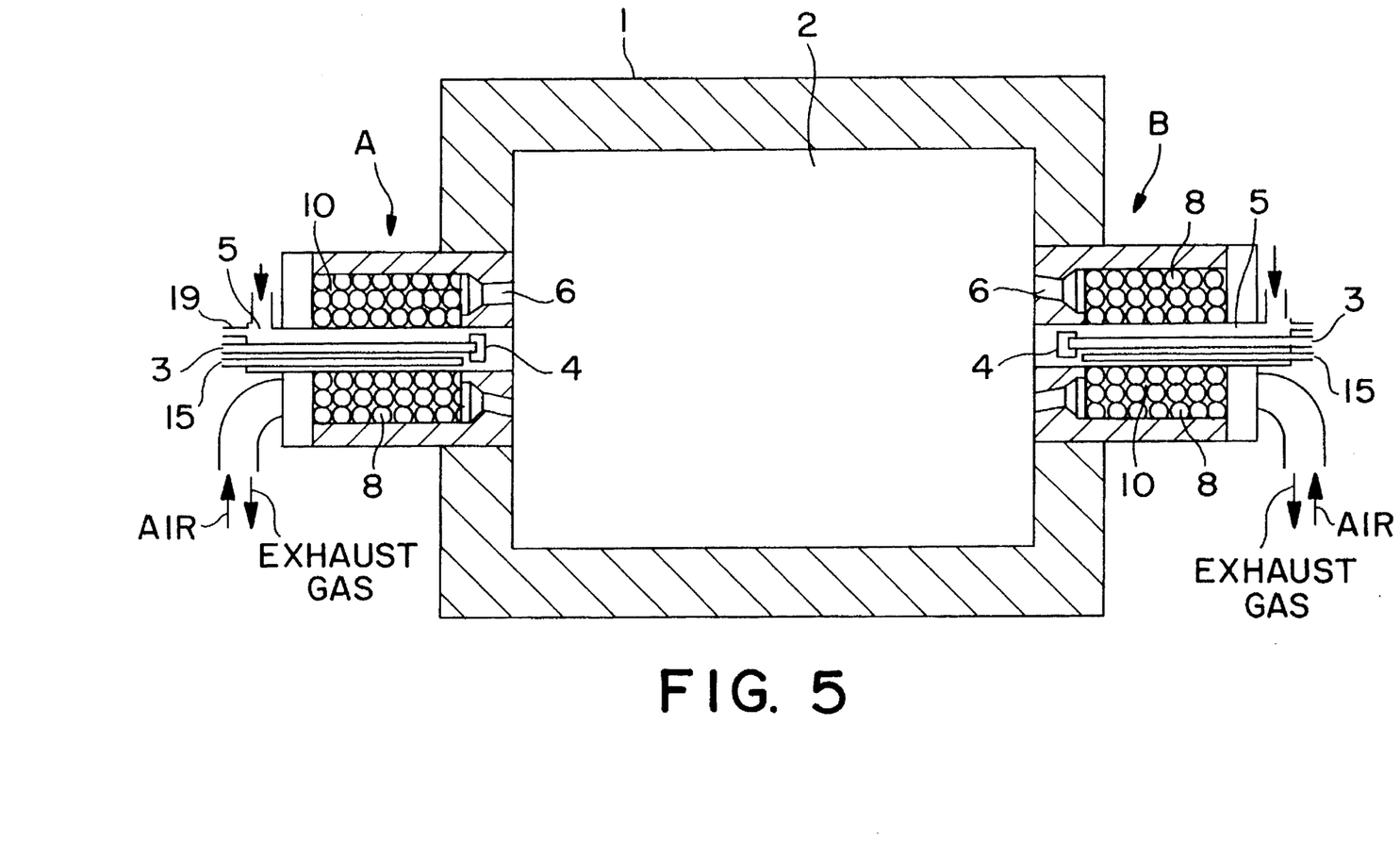
FIG. 5 is an illustration of an installed pair of regenerative burners of shown in FIG. 4(a) and 4(b) and combined to show an embodiment of the regenerative burner system of the present invention.

FIGS. 4 and 5 show another embodiment of the present invention where no change-over valve is used. In the regenerative burner A, when fuel is introduced into the fuel supply section 3, it is mixed with the air supplied from the room temperature air supply section 5, near the flame stabilizing section 4 on the downstream side, to form a stable flame 18 in the furnace. The amount of room temperature air is preferably small, accounting for less than 15% of the total air introduced into the furnace. The combustion caused by the small amount of room temperature air does not feed through the heat storage material 8 and takes place at low temperatures. In addition, since the major combustion reaction subsequent to the stabilizing flame, takes place in the furnace 2, it is a slow combustion using a large amount of furnace combustion gas 16, before producing high air temperatures (to be described later). Therefore, the production of NOx is effectively reduced.

While the stable flame 18 is formed and sustained, the high temperature air heated by the heat storage material 8 is injected at a high velocity from the tips of the pre-heated high temperature air supply sections 6. The pre-heated high temperature air mixes with a large amount of furnace combustion gas, which results in a low oxygen partial pressure while combustion takes place, with the flame ideally stabilized by slow combustion and thus low NOx forming combustion is sustained. The pre-heated high temperature air supply sections 6 are provided as plural air holes, and the high velocity injection from the air holes increases the effect of entraining the furnace combustion gas, to further promote the reduced NOx production. In the above combustion method, the pilot burner 15 is optionally located through the room temperature air supply section 5 near the flame stabilizing section 4, and since the room temperature air is configured to be continuously injected into the furnace 2, irrespective of whether the regenerative burner is in a combustion mode or exhaust mode, the pilot burner 15 and the flame stabilizing section 4 are always cooled by the room temperature air and protected form deterioration due to high temperature oxidation. Therefore, no special cooling piping is required. Furthermore, since the pilot burner 15 is located in a place where pressure fluctuation is very small, a stable pilot flame can be formed. If the pilot burner 15 is not used, an ignition spark can be generated directly in the flame stabilizing section 4, to ignite a small amount of fuel, and after the formation of a reliable flame has been established, the amount of fuel can be increased. A flame detector 19 installed in the room temperature air supply section 5 can give a cooling effect similar to that achieved by the pilot burner 15.

The exhaust gas is discharged through the pre-heated high temperature air supply sections 6 of the regenerative burner B which is in the exhaust mode, to pre-heat the heat storage material 8 in B. The above combustion and exhaust cycle are repeated alternating between regenerative burner A and B, for example every tens of seconds to several minutes.

Since, air and fuel are directly injected into a large wide furnace space, large amounts of furnace gas is sucked into the various jets and mixed with the injected fuel and air, whereas conventional combustion methods inject air and fuel into narrow burner spaces for combustion. Furthermore, since the heat storage material 8 is located partially or wholly in the furnace wall 1, the exhaust temperature in the furnace wall 1 is reduced, as a result refractory heat-insulating lining is not required for the regenerator 10 which is another significant advantage of the present invention.

Figure 6A:
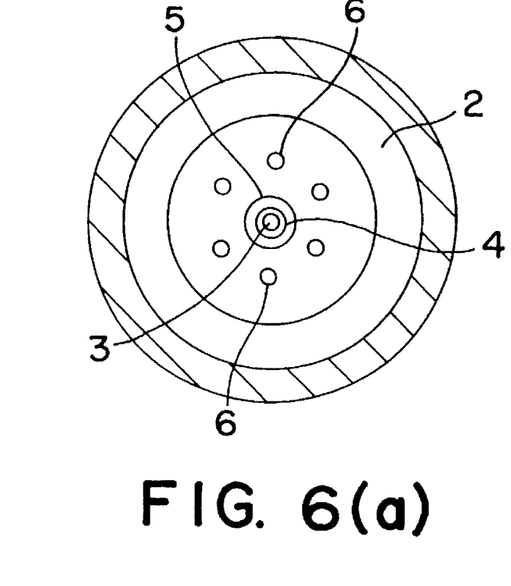
FIG. 6(a) and 6(b) is an illustration of yet another embodiment of the regenerative burners of the present invention.
Figure 6B:
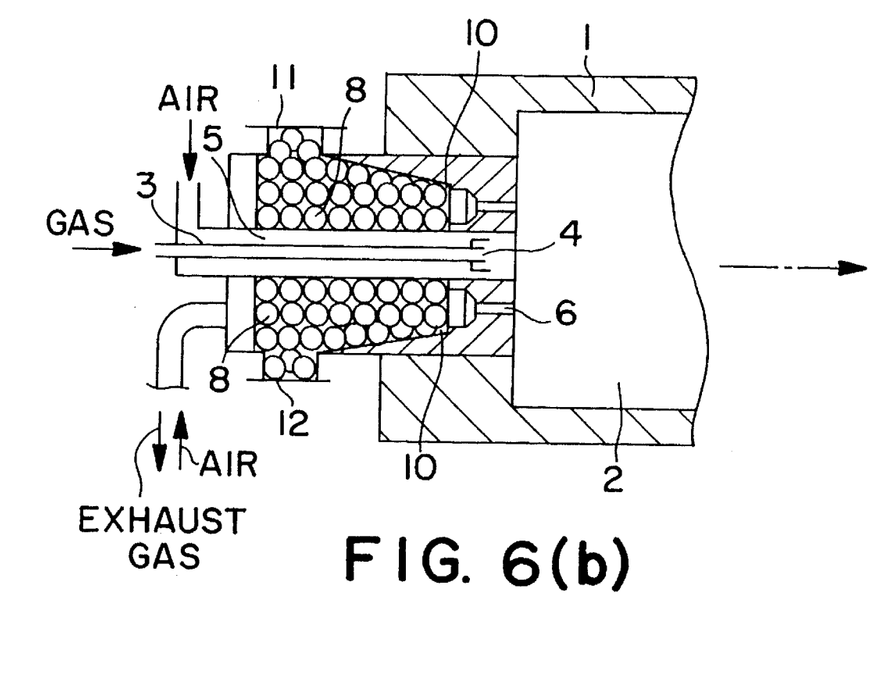

In FIG. 6(a) and 6(b) the regenerator 10 is tapered toward the front, the heat storage material 8 can be easily removed from the regenerator 10 simply by removing the cover on the heat storage material outlet 12. The heat storage material 8 can be removed from the regenerator by allowing the material to flow out. To pack the regenerator 10 with the storage material 8, the cover of the heat storage material outlet 12 is closed and the cover of the heat storage inlet 11 is opened. Then the heat storage material 8 is packed into the regenerator 10 to achieve the desired setup. The regenerator 10 can be easily packed with the heat storage material 8 and this can be done without forming any excessive spacing in the material.

The present invention has a number of advantages. (1) The method results in the recirculation of furnace gas before any flames are generated in the furnace interior and while the continuous combustion occurs, as a result no local high temperature zones are formed and NOx emission is kept to a low level. (2) A stabilized flame can be maintained using a small amount of room temperature air and interacts with the furnace combustion gas before it encounters pre-heated high temperature air in the furnace. The pre-heated high temperature air jets encounter and mix with the furnace combustion gas as the air is injected into the furnace which lowers the oxygen partial pressure. Since the main combustion progresses while the pre-heated high temperature air is mixing with the furnace combustion gas in a lowered oxygen partial pressure, a slow combustion occurs and a low flame temperature results which effectively reduces the formation of NOx. (3) Since the flame is generated directly in the furnace, burner tiles to surround the flame are not necessary and since the heat storage material is located in the furnace wall, the temperature of the exhaust gas coming out of the storage material is so low no refractory heat insulating lining is required. Further, heat loss is minimized. (4) In the embodiments shown in FIGS. 4 and 5, room temperature air is continuously provided to sustain a stable flame, cooling the fuel supply section, pilot burner, flame detector, etc. As a result no special cooling pipe, etc. is required, thus equipment cost is reduced and since the stable flame is formed at a place subject to little pressure fluctuation and low flow velocity, there is no concern that the stable flame may be extinguished. (5) Since the combustion method of the present invention is not a two-stage combustion method which requires minor combustion in the primary combustion chamber, this chamber is not required, allowing the total structure to be reduced in size. Furthermore, since the stable flame is formed by cold air combustion using a small amount of room temperature air, the flame temperature is kept low and the flame stabilizing section and the fuel supply section are protected from deterioration due to high temperature oxidation with enhanced reliability. In addition, since the heat is effectively stored in the furnace wall, a very high degree of thermal efficiency is achieved. (6) In the embodiments shown in FIGS. 4 and 5, the stability of the main flame at low temperatures is secured by a stable flame at the flame stabilizing section, even without switching air from the room temperature supply section to the pre-heated high temperature supply sections as the furnace temperature varies, a low NOx state can be sustained irrespective of the furnace temperature. (7) Since the structure is simplified, the equipment cost is reduced and since the heat is efficiently stored in the furnace wall, a very high thermal efficiency is achieved. (8) The packing and replacement of the heat storage material can be performed very easily while the burners are installed in the furnace, making the burners easier to use. (9) Since no "clearance" (excessive spacing) is formed in the regenerator at the top of the heat storage material, channeling is prevented which results in a very efficient high waste heat recovery. (10) The tapered regenerator eliminates any wasted space when the heat storage material is packed. (11) Given that the heat storage material is easily exchanged, even dirty exhaust gas which could not be used in conventional burners, can be used in the regenerative burners of the present invention.

What is claimed is:

1. A regenerative burner comprising a fuel supply section having a tip which opens in a furnace; a flame stabilizing section located at said tip of said fuel supply section; a room temperature air supply section having a tip which opens in said furnace and located around said fuel supply section; plural pre-heated high temperature air supply sections having tips which open in said furnace and are located around said fuel supply section; and heat storage material located in a regenerator and upstream of said pre-heated high temperature air supply sections.

2. A regenerative burner according to claim 1 further comprising a header located upstream of said pre-heated high temperature air supply sections and downstream of said heat storage material.

3. A regenerative burner according to claim 2 wherein said header is tapered in shape.

4. A regenerative burner according to claim 1 wherein a pilot burner is located through the room temperature air supply section and near said flame stabilizing section.

5. A regenerative burner according to claim 1 wherein said regenerator having a top side and a bottom side is packed with loose heat storage material and tapered toward said furnace; a heat storage material inlet provided at said top side of said regenerator and away from said furnace; and a heat storage material outlet provided at said bottom side of said regenerator.

6. A regenerative burner according to claim 1, wherein said room temperature air supply section having an inlet and said pre-heated high temperature supply sections having an an inlet and a change-over valve which connects with said inlets whereby operating said change-over valve opens one inlet while closing the other inlet.

7. A regenerative burner system comprising a furnace and one or more pairs of regenerative burners according to claim 1 operatively installed in said furnace.

8. A regenerative burner system according to claim 7 wherein the heat storage material is located wholly or partially within a wall of said furnace.

9. A regenerative combustion method using a regenerative burner system according to claim 7 comprising the steps of:

supplying air from said room temperature air supply sections into said furnace;

injecting fuel from said fuel supply section;

mixing air with fuel at said flame stabilizing section for continuous combustion when the furnace temperature is below fuel ignition temperature;

stopping air supply through said room temperature air supply section when the furnace temperature is above said ignition temperature;

injecting air from said pre-heated air supply sections of a first regenerative burner;

and mixing said fuel injected from said fuel supply section with air from said pre-heated air supply section and furnace combustion gas in said furnace to form a combustion mixture, whereby combustion occurs and nitrogen oxide formation is minimized.

10. A regenerative combustion method according to claim 9 further comprising:

exhausting said combustion mixture into a second regenerative burner through said pre-heated high temperature air supply section;

heating said heat storage material in said second regenerative burner;

and after changing the second regenerative burner mode from exhaust to combustion, injecting air from said pre-heated air supply section of a second regenerative burner into said furnace;

forming a combustion mixture of injected pre-heated air, fuel and furnace gas;

combusting said combustion mixture;

exhausting said combustion mixture into said first regenerative burner through said pre-heated high temperature air supply section;

heating said heat storage material in said first regenerative burner;

and after changing a burner mode, injecting air from said pre-heated air supply section of said first regenerative burner into said furnace, whereby combustion occurs.

11. A regenerative combustion method according to claim 10 wherein said steps occur at a rate of between tens of seconds to several minutes whereby alternate combustion occurs.

12. A regenerative combustion method using a regenerative burner system according to claim 7 comprising the steps of:

supplying a steady stream of air from said room temperature air supply sections into said furnace;

injecting fuel from said fuel supply section;

mixing air with fuel at said flame stabilizing section forming a stable flame;

injecting air from said pre-heated air supply sections of a first regenerative burner;

and mixing said fuel injected from said fuel supply section with air from said pre-heated air supply section and furnace combustion gas in said furnace to form a combustion mixture, whereby a stable flame combustion occurs and NOx formation is minimized.

13. A regenerative combustion method according to claim 12 further comprising:

exhausting said combustion mixture into a second regenerative burner through said pre-heated high temperature air supply section;

heating said heat storage material in said second regenerative burner;

and after changing a burner mode from exhaust to combustion, injecting air from said pre-heated air supply section of a second regenerative burner into said furnace;

forming a combustion mixture of injected pre-heated air, fuel and furnace gas;

combusting said combustion mixture;

exhausting said combustion mixture into said first regenerative burner through said pre-heated high temperature air supply section;

heating said heat storage material in said first regenerative burner;

and after changing a burner mode from exhaust to combustion, injecting air from said pre-heated air supply section of said first regenerative burner into said furnace, whereby alternate combustion occurs.

* * * * *